July 3, 1962 J. H. PALMER 3,041,852
REFRIGERATED GARBAGE STORAGE DEVICE
Filed Sept. 28, 1959
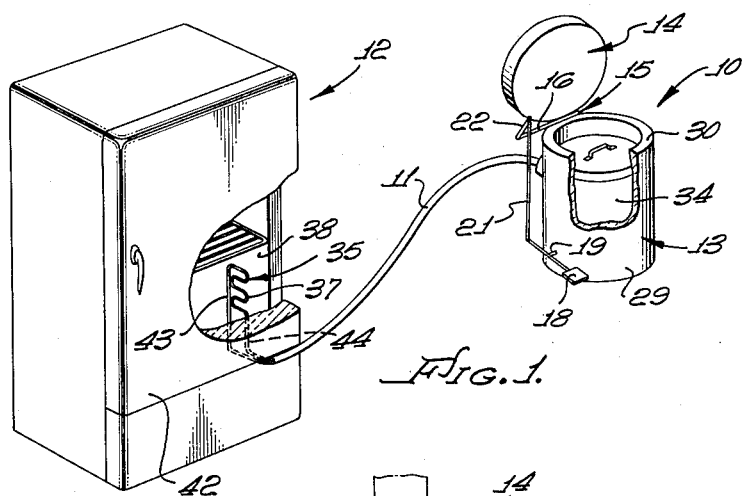
Fig. 1.
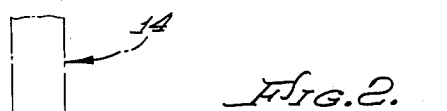
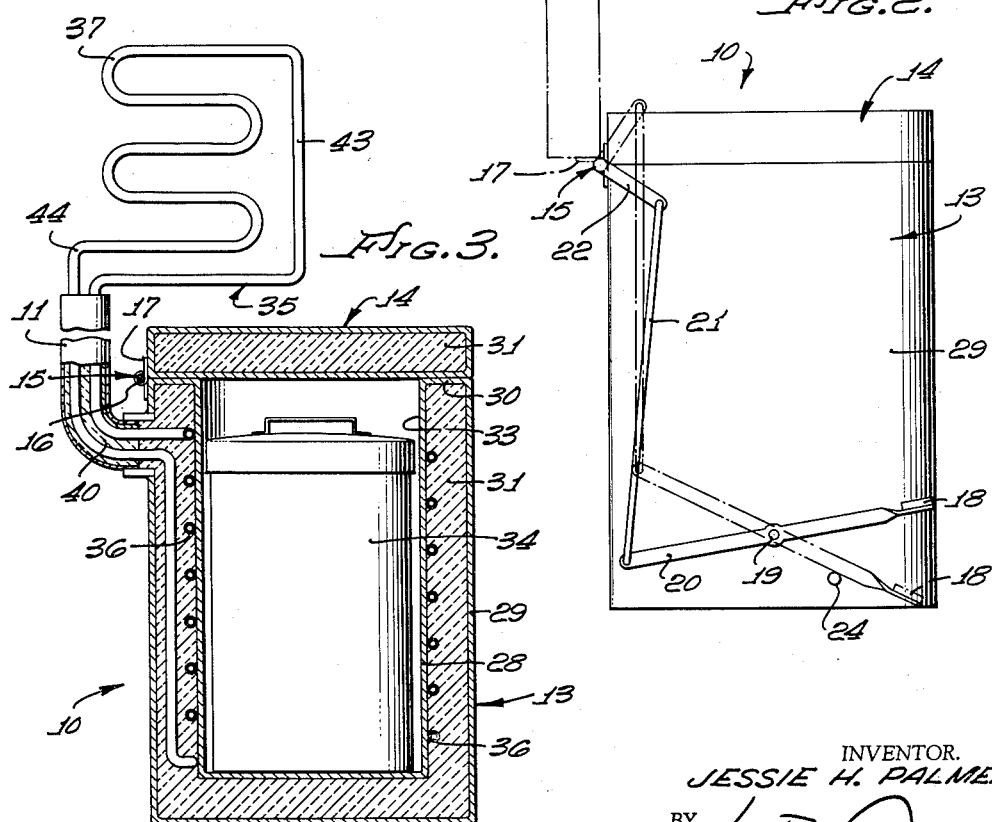
Fig. 2.
Fig. 3.
INVENTOR.
JESSIE H. PALMER
BY
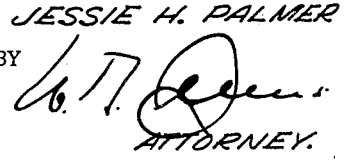
ATTORNEY.

United States Patent Office 3,041,852
Patented July 3, 1962

3,041,852
REFRIGERATED GARBAGE STORAGE DEVICE
Jessie H. Palmer, 5035 Louise Drive, La Canada, Calif.
Filed Sept. 28, 1959, Ser. No. 842,727
2 Claims. (Cl. 62—334)

This invention relates to garbage storage facilities and more particularly to an improved refrigerated garbage storage device suitable for domestic use and adapted to be cooled by a self-contained refrigeration system featuring a condenser adapted to be cooled from a cooling source located remotely from the garbage storage chamber proper.

The handling of household garbage continues to present many vexatious problems despite long continued efforts of designers to find a satisfactory solution. The problem is particularly serious during the warmer months of the year when discarded foodstuffs decay quickly generating objectionable odors, creating unsanitary conditions, providing a prolific breeding place for bacteria and the like and attracting flies and other insect life. During the colder months of the year these problems are usually minimized principally because the colder prevailing weather conditions are not conducive to food spoilage with the result that odors are not generated and flies and other pests are not attracted. Proposals have been made to store garbage containers in cool places but this is not always convenient or feasible, nor is it practicable under many living conditions.

There is provided by the present invention a simple, inexpensive and rugged garbage storage device incorporating an unusually simple but highly effective refrigeration system lacking moving parts and requiring no connection to a power source.

Stated differently, the garbage storage facility here provided makes use of an open-topped heat insulated compartment having a metallic lining for receiving any suitable garbage container and arranged to be refrigerated by means of a closed loop circuit of flexible metallic tubing charged with a refrigerant. One sinuous portion of this circuit is in excellent heat conducting relation with the metallic wall of the garbage storage chamber to the end that liquid refrigerant will vaporize readily to provide ample cooling capacity for the garbage storage chamber. The circuit is so arranged that the vapor formed in producing refrigeration rises into another sinuous portion of the loop circuit located entirely outside the garbage storage device and in heat exchange with a source of cooling whereat the refrigerant vapor is condensed for gravity return flow to the lower end of the garbage cooling portion of the loop.

Typically the condensing portion of the loop circuit is designed for mounting within the cooled chamber of another refrigeration system, such as the household refrigerator without, however, need for direct connection between the closed loop circuit and the refrigeration system of the household refrigerator. Instead it is merely necessary to locate the condensing portion of the garbage refrigeration system against the cooled interior wall of the refrigerator. The location of the condensing coil in this position does not detract appreciably from the normal use of the storage capacity of the refrigerator. Such use of the cooled wall of the refrigerator is found to be highly effective and efficient in condensing the refrigerant vapor produced by the garbage storage facility.

Accordingly, the garbage storage facility provided by this invention may be located remotely from the domestic refrigerator and preferably in the place normally provided for the storage of garbage and yet refrigerated from the household refrigerator through inconspicuous flexible tubing connections with a condensing coil arranged to be cooled by the household refrigerator. In other arrangements of equal suitability, the condensing portion of the garbage facility refrigeration loop may be cooled through heat exchange with an air conditioning system or with a cooling section of a sharp freezer.

Accordingly, it is a primary object of this invention to provide a simple, lightweight, inexpensive, highly effective refrigerated garbage storage facility suitable for domestic use.

Another object of the present invention is to provide a heat insulated storage chamber having an easily operated access opening closure and featuring a self-contained refrigeration system having no moving parts and requiring no power connection but arranged to use the cooling capacity of a suitable refrigerated source external to the storage chamber.

Another object of the invention is the provision of a garbage storage facility utilizing a closed loop refrigeration circuit devoid of internal moving parts and charged with a refrigerant which absorbs heat from the garbage storage chamber through a change of state thereof and having a refrigerant condensing portion thereof permanently adapted to be readily installed against a suitable source of cooling such as the interior of a household refrigerator or the like.

Another object of the invention is the provision of the refrigerated garbage storage facility having a built in closed loop refrigerating circuit part of which is located in heat exchange with the garbage storage chamber and another part of which is adapted to be located in heat exchange relation only with the heat absorbing surface of another refrigeration system.

These and other more specific objects will appear upon reading the following specification and claims and upon considering in connection therewith the attached drawing to which they relate.

Referring now to the drawing in which a preferred embodiment of the invention is illustrated.

FIGURE 1 is a perspective view showing the garbage storage facility of this invention operatively connected with the portion of a domestic refrigerator, parts of each being broken away to show constructional details;

FIGURE 2 is a side elevational view of the garbage storage facility on an enlarged scale and illustrating the operating linkage for raising the closure for the access opening; and FIGURE 3 is a vertical sectional view through the garbage storage facility and illustrating the closed loop refrigeration system employed to cool the storage compartment thereof.

Referring now more particularly to FIGURE 1, there is shown an illustrated embodiment of the present invention wherein the heat insulated garbage storage device designated generally 10 is shown operatively connected through flexible tubing 11 with a conventional domestic refrigerator 12. Garbage storage facility 10 typically comprises an open topped heat insulated cylindrical chamber 13 having a heat insulated closure 14 pivotally connected thereto as by a rugged hinge 15. This hinge has its pintle 16 welded or otherwise rigidly secured to the upper leaf 17 of the hinge so that counterclockwise rotation of the pintle, as the parts are viewed in the drawing, will be effective to lift closure 14 to its open position such as that indicated in dot and dash line in FIGURE 2.

Preferably the means for effecting the opening of closure 14 comprises an operating linkage best illustrated in FIGURE 2. This linkage includes a foot operated pedal 18 pivotally supported on a stud 19 fixed to the side of main housing 13. The rear end 20 of pedal 18 is pivotally connected to a rigid link 21 having its upper end socketed in an arm 22 rigid with the end of hinge pintle 16. It will be recognized that as foot pedal 18 is depressed toward the position indicated in dot and dash lines in FIGURE 2, that link 21 is effective to rotate arm 22 counterclockwise to raise the closure toward its upright open position. When fully open, the weight of closure 14 may counterbalance rearwardly to the extent permitted by stop pin 24 fixed to the outer wall of housing 13 and extending into the path of the foot pedal. If desired, pin 24 may be so positioned that closure 14 is counterbalanced toward closed position when fully open. In this event the removal of foot pressure from pedal 18 allows the closure to return to its closed position automatically.

Housing 13 may be constructed in various ways well known to those skilled in the construction of insulated chambers. As here shown, housing 13 includes inner and outer cup shaped sheet metal shells 28 and 29 joined across their upper edges as by a flat ring 30, the hollow space between the shells being filled with suitable heat insulating material 31. Closure 14 is constructed similarly to the main housing.

As will be evident from the showing, inner shell 28 provides a large unrestricted storage chamber 33 having smooth interior walls and within which any suitable garbage container, as typical garbage receptacle 34, may be removably located.

The refrigeration system forming an important feature of this invention will be understood as preferably comprising a continuous closed loop of flexible tubing 35 having a heat absorbing sinuous portion 36 encircling the inner metallic casing 28 and brazed or otherwise connected therewith for the efficient transfer of heat. The opposite end of loop 35 is similarly formed with a sinuous section 37 the function of which is to dissipate heat to a heat absorbing body, as the cooled interior wall 38 of domestic refrigerator 12. It will be understood that closed loop 35 may be of substantially uniform cross section throughout with the possible exception of an enlargement at the upper discharge end of the heat absorbing lower loop 36 at its point of junction with vapor riser leg 43 and serving as a vapor separation chamber. Desirably, there are present interiorly of this loop circuit no valves, restrictors, or moving parts of any kind.

Refrigeration system loop 35 is charged with a suitable refrigerant medium, such as methylchloride in an amount and to a pressure well known to those skilled in the construction and operation of refrigeration systems. If the heat dissipating coil 37 is to be secured in good heat conducting relation with cold wall 38 under usual temperature conditions of 40° F. to 43° F. as is customary, then the charge pressure for the methylchloride would be approximately 27 to 30 pounds gauge. Under these conditions refrigeration circuit 35 easily maintains the temperature of garbage storage chamber 33 close to the freezing point. It is pointed out that various other refrigerant mediums are suitable, as for example, sulphur dioxide.

It will be understood that heat absorbing coil 36 and heat dissipating coil 37 may be spaced at very substantial distances from one another and interconnected by flexible tubing 11 preferably well insulated from one another as well as from adjacent objects and the ambient air by heat insulating material 40. Owing to the small diameter of the tubing required it is quite feasible to flatten the tubing slightly in portions thereof passing across the jamb of the refrigerator door 42. Usually a short section of the flexible sealing gasket normally applied to the door jamb is cut away to provide a passage for the flattened tubing.

Although not so shown in FIGURE 1, it is pointed out that heat dissipating coil 37 is preferably suitably held pressed against cooled wall 38 of the refrigerator, or bonded thereto by a suitable heat conducting adhesive to facilitate the rapid transfer of heat from the vapor within the coil to wall 38, it being apparent that the capacity of the refrigeration system is dependent in large measure on the effective transfer of heat to wall 38. The only portion of coil 37 which is not in good heat conducting relation with wall 38 is the vapor riser leg 43. This leg discharges into the uppermost portion of condensing coil 37 to the end that condensing refrigerant may flow by gravity through liquid return leg 44 of the system.

The operation of the described refrigerating system will be quite apparent from the foregoing detailed description of its components. It is pointed out that if one desires to avoid the use of moving parts and particularly of pumps for circulating the refrigerant medium within loop 35 or to avoid the use of a vapor lift pump within the system to elevate condensate into heat absorbing coil 36, then it is desirable to locate garbage storage facility 10 at an appreciably lower level than heat dissipating coil 37. When so arranged, no liquid transfer device of any kind is required, and the condensate returns by gravity to the heat absorbing coil and the vapor produced in the latter coil rises to the top of heat dissipating coil 37. It is, of course, feasible to locate storage compartment 10 on the same level as refrigerator 12 provided that heat dissipating coil 37 is located at a higher elevation than coil 36, as in the upper part of the food storage compartment.

So long as there is need for refrigeration within storage chamber 33, the excess heat therein is conducted through inner wall 28 and into coil 36 where it vaporizes liquid refrigerant to produce cooling. Such vapor rises as bubbles through the liquid and passes upwardly along vapor leg 43 into the top of condensate coil 37. There, heat carried by the vapor transfers to cold wall 38 of the refrigerator with the result that the vapor liquefies and flows by gravity through return leg 44 of the circuit into the bottom of heat absorbing coil 36. When the demand for cooling has been satisfied there will be no further transfer of heat to vaporize the liquid and conditions remain substantially static until there is again need for refrigeration.

While the particular refrigerated garbage storage device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A unitary self-contained refrigerated garbage storage device for domestic use, said device having a hermetically sealed refrigeration system free of internal restrictor valves or moving parts and charged with refrigerant in readiness for the installation of its refrigerant condensing portion against a cooled heat-absorbing wall of a domestic refrigerator to condense refrigerant vapor therewithin thereby to provide the user with a refrigerated garbage storage device which can be attached to and indirectly cooled by a conventional domestic refrigerator without need for making changes in the latter or disturbing the path of refrigerant flow in the latter; said garbage storage device comprising, a top-opening insulated compartment normally closed by an insulated cover, the interior of said compartment having a heat conducting interior side wall adapted to house a removable container for garbage to be refrigerated, a hermetically sealed closed loop of flexible conduit of material having good heat conducting properties, a portion of said conduit being arranged helically of and secured in good heat exchange relation to said compartment side wall to cool the same, the opposite ends of said helical portion extending outwardly through the outer wall of said insulated compartment in generally closely-spaced parallel relation and extending to a refrigerant condensing portion of said closed loop located remotely from said insulated compartment with the upper end of said helical portion being connected to the uppermost part of the condensing portion of said loop, said condensing portion and the adjacent lengths of the conduit connected thereto being adapted to be installed through the door and within the food compartment of a conventional domestic refrigerator with the condensing portion of said closed loop held pressed against a refrigerated heat absorbing interior wall of the refrigerator food compartment, the portions of said closed loop conduit adjacent said condensing portion extending across and pressed into the resilient gasket material for the doorway rim, and a charge of a refrigerant medium sealed within said closed loop of a type which liquefies in said condensing portion and returns by gravity flow to the lower end of said helical portion of the loop and which liquid then changes to vapor through heat absorbed from the interior of said garbage compartment and flows back to the top of said condensing portion to be recondensed.

2. The combination defined in claim 1 characterized in the provision of a hinge connection between the upper portion of said heat insulated compartment and said insulated closure for said access opening, and foot-operated linkage means operable when depressed to open said closure.

References Cited in the file of this patent
UNITED STATES PATENTS

| | | |
|---|---|---|
| 1,703,299 | Copeman | Feb. 26, 1929 |
| 2,033,228 | Buffington | Mar. 10, 1936 |
| 2,246,975 | Geibel | June 24, 1941 |
| 2,346,530 | Wyllie | Apr. 11, 1944 |
| 2,401,613 | Charland | June 4, 1946 |
| 2,728,199 | Kurtz | Dec. 27, 1955 |
| 2,910,206 | Hodgson | Oct. 27, 1959 |